United States Patent
Maas et al.

(10) Patent No.: US 10,575,038 B2
(45) Date of Patent: Feb. 25, 2020

(54) DELIVERING CONTENT

(71) Applicant: PIKSEL, INC., Wilmington, DE (US)

(72) Inventors: Hans-Jurgen Maas, Mainz (DE); Philip Shaw, York (GB); Mark Christie, London (GB)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/561,641

(22) PCT Filed: Mar. 24, 2016

(86) PCT No.: PCT/EP2016/056567
§ 371 (c)(1),
(2) Date: Sep. 26, 2017

(87) PCT Pub. No.: WO2016/156208
PCT Pub. Date: Oct. 6, 2016

(65) Prior Publication Data
US 2018/0077439 A1    Mar. 15, 2018

(30) Foreign Application Priority Data
Mar. 27, 2015 (GB) .................................. 1505292.1

(51) Int. Cl.
*H04N 21/258* (2011.01)
*H04N 21/2343* (2011.01)
(Continued)

(52) U.S. Cl.
CPC . *H04N 21/25866* (2013.01); *H04N 21/23439* (2013.01); *H04N 21/278* (2013.01);
(Continued)

(58) Field of Classification Search
CPC ................................................ H04N 21/25866
See application file for complete search history.

(56) References Cited

U.S. PATENT DOCUMENTS 8,978,075 B1    3/2015  Kaiser
2003/0093791 A1*    5/2003  Julia ................. H04N 7/17318
725/40

(Continued)

OTHER PUBLICATIONS

International Search and Written Opinion, dated Jun. 10, 2016, European Patent Office.

*Primary Examiner* — Michael H Hong
(74) *Attorney, Agent, or Firm* — Holzer Patel Drennan

(57) ABSTRACT

A content delivery system comprising: a communication network; a mapping component storing media content aspect variant data enabling access to media content in a plurality of aspect variants; a content delivery component connected to the network and configured to access and deliver media content aspect variant data stored in the mapping component to devices connected to the network; an action request or component which is configured to receive a request from a user of a media consumption device that an aspect variant of media content is to be delivered to at least one further media consumption device, and cause the content delivery component to deliver media content aspect variant data associated with said aspect variant to the at least one further media consumption device to enable said aspect variant to be consumed at the at least one further media consumption device.

20 Claims, 6 Drawing Sheets

(51) Int. Cl.
  *H04N 21/41* (2011.01)
  *H04N 21/4784* (2011.01)
  *H04N 21/81* (2011.01)
  *H04N 21/278* (2011.01)
  *H04N 21/83* (2011.01)

(52) U.S. Cl.
  CPC ......... *H04N 21/41* (2013.01); *H04N 21/4126* (2013.01); *H04N 21/4784* (2013.01); *H04N 21/812* (2013.01); *H04N 21/83* (2013.01)

(56) References Cited

U.S. PATENT DOCUMENTS

| | | | |
|---|---|---|---|
| 2006/0136969 A1* | 6/2006 | Patton | A63J 25/00 725/78 |
| 2008/0034095 A1 | 2/2008 | Richardson | |
| 2012/0079541 A1 | 3/2012 | Pan | |
| 2012/0240175 A1* | 9/2012 | Ohmori | H04N 21/23439 725/112 |
| 2012/0324493 A1* | 12/2012 | Holmdahl | H04H 60/33 725/12 |
| 2014/0089967 A1 | 3/2014 | Mandalia | |
| 2014/0089992 A1* | 3/2014 | Varoglu | H04N 21/4122 725/81 |
| 2014/0229978 A1* | 8/2014 | Rudman | H04N 21/2542 725/32 |

* cited by examiner

DELIVERING CONTENT

TECHNICAL FIELD

This invention relates to delivering content to a user.

BACKGROUND

Computer devices exist which are considered to display content to a user on demand. For example, subscription services allow a user to select particular television channels which are made available to a user device on which a user can view the channels. Viewing of the channels can be subject to payment. When subject to payment, access to the content is controlled by determining whether or not the user has made a payment for the content and as such is permitted to view it. In a subscription service content can be live/linear. Other on-demand content is available, such as, On-Demand TV which allows individual programmes to be begun at the viewer's leisure.

Other types of content are also available on demand, for example, downloaded or streamed to a user following suitable payment, as with On Demand TV or pay per view (PPV).

It is increasingly the case that a user may be using more than one computer device at one time. For example, a user may be watching television on a large screen, but may also have to hand his smartphone with its smaller screen. There may be an interaction between the smartphone and the television as regards the content which is displayed.

Content is available in many different forms, and is becoming increasingly burdensome for a user to determine the form of content that they want to consume on the device on which they want to consume it.

SUMMARY

According to an aspect of the present invention, there is provided a content delivery system comprising: a communication network; a mapping component storing media content aspect variant data enabling access to media content in a plurality of aspect variants; a content delivery component connected to the communication network and configured to access and deliver media content aspect variant data stored in the mapping component to devices connected to the communication network; an action requestor component which is configured to receive a request from a user of a media consumption device that an aspect variant of the media content is to be delivered to at least one further media consumption device, and cause the content delivery component to deliver media content aspect variant data associated with said aspect variant to the at least one further media consumption device to enable said aspect variant of the media content to be consumed at the at least one further media consumption device.

The content delivery system may be configured to receive the request from the user of the media consumption device during consumption of the media content at the media consumption device.

The mapping component can store the aspect variant data in associated sets of variants of media content, whereby each variant in a set has an associative link to one or more other variants in the set.

For example, a movie might have aspect variants that include: the stream of the movie, a trailer, an eBook upon which the movie is based, a downloadable version of the movie for offline viewing. The collection or set of aspect variants form a pool of resources between which the user may transition at their request.

The content delivery system can comprise a store holding a set of permission vouchers for each of a plurality of users of the system. In this case, the action requestor component may be configured to determine if there is a permission voucher in the set for the user of a type that grants permission to deliver the media content aspect variant data to the at least one further media consumption device, and if so, to cause a content delivery component to deliver the media content aspect variant data to the at least one further media consumption device.

The action requestor component may be configured to select the aspect variant of the media content based on the set of permission vouchers for the user.

Thus, the aspect variant may be dependent on the user having acquired certain permission vouchers (rewards).

The plurality of aspect variants may include different versions of the same content type, or may include different content types.

For example, a short version of the media content may be consumed at the media consumption device, and a long version of the media content is available as the aspect variant.

A non-interactive version of the media content may be consumed at the media consumption device, and an interactive version of the media content may be accessed as the aspect variant.

An aspect variant may constitute advertising content associated with the piece of media content being played at the media consumption device. When the aspect variant is a different content type, this could constitute for example a downloadable version of a game of which a live stream of the computer game being played is being displayed at the media consumption device. The game could be a full playable version of the game or a limited feature playable version of the game, dependent on the permission vouchers.

The media content can be video advertising content, and the aspect variant can be static image advertising content. Alternatively, the media content could be static image advertising content, and the aspect variant is video advertising content.

A user can transition back and forth between aspect variants, or from one aspect variant to a further aspect variant. For example, in the example given earlier of a movie having an aspect variant which is an eBook upon which the movie is based, the user may, while reading the eBook transform back to the movie.

Another aspect of the invention provides a method for delivering content comprising: receiving from a user of a first media consumption device a request for an aspect variant of the media content; accessing a set of aspect variants data of aspect variants of the media content stored at a mapping component; causing at least one of the aspect variants to be delivered to a second media consumption device of the user.

Media content may be being consumed at the first consumption device.

According to another aspect of the present invention there is provided a computer program product, the computer program product being embodied on a non-transient computer-readable medium and configured so as when executed on a processor to: receive from a user of a first media consumption device a request for an aspect variant of the media content; access a set of aspect variants data of aspect variants of the media content stored at a mapping component; cause at least one of the aspect variants to be delivered to a second media consumption device of the user.

Media content may be being consumed at the first consumption device.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Figure 1:
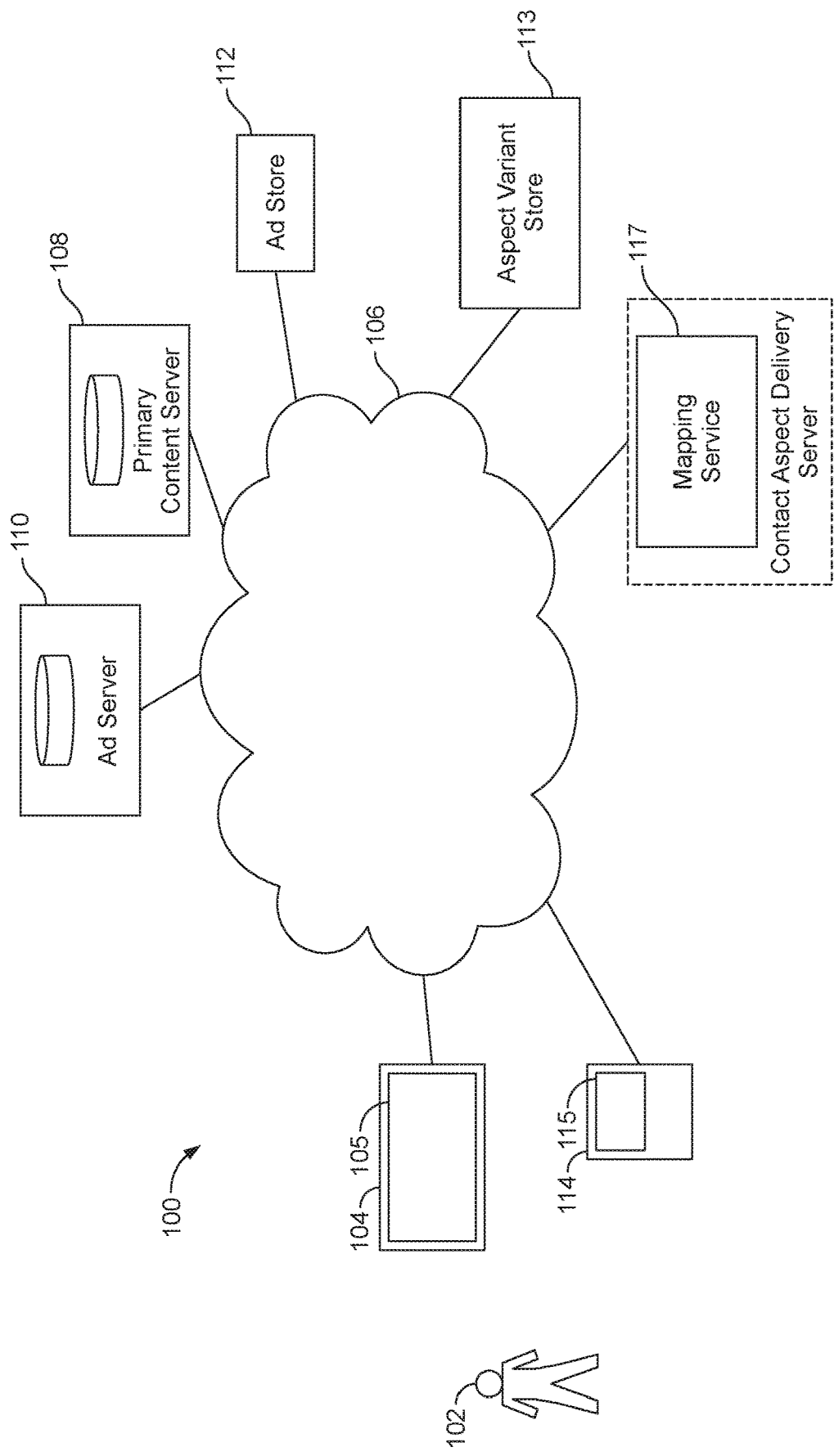
FIG. 1 shows a content delivery system.

Reference is first made to FIG. 1 to show the infrastructure within which embodiments of the invention are implemented.

FIG. 1 shows a content delivery system 100. A content consuming user 102 (current content consumer) operates a media playback device 104 with a display 105 that is capable of connecting to a computer network 106 of the content delivery system 100. The media playback device 104 is a computer device in the form of, for example, a television, smartphone device, tablet computing device, etc. The computer network 106 is a packet-based network such as the Internet in this embodiment but may not be packet-based in other embodiments.

The content consuming user 102 may also have a companion user device 114 with a display. This companion user device 114 can take the form of any kind of computer device including but not limited to tablets, mobile phones, smartphones, laptops, etc.

Both the media playback device 104 and the companion user device 114 have a network connection for connecting to the computer network 106. The network connection can be wired such as Ethernet or wireless (WiFi, GSM etc.), or any suitable interface which allows communication with the network 106. The media playback device 104 and the companion user device 114 may connect to the computer network 106 using the same type of network connection or different types of network connections.

Connected to the network 106 is a primary content providing server 108 of the content delivery system 100 which holds primary (desired) content for delivering to users of the content delivery system 100. The media content is stored in the form of a collection of media assets (that is, individual pieces of media content), each media asset being, for example, an episode of a television show, a movie, or a recording of a sports event (e.g. football match) etc.

Also connected to the network 106 is an auxiliary content providing server 110 of the content delivery system 100 which holds an auxiliary content database identifying different pieces of auxiliary content (e.g. video content, static image content, text-based content, audio content etc.) that can be delivered to users of the content delivery system 100. For example, in some embodiments the database is a database of network locations (e.g. web addresses in the form of a Uniform Resource Locators (URLs)) at which the auxiliary content is available. One particular type of auxiliary content is advertising content. In particular embodiments, the server 110 is an ad ("advertisement") server holding a database of advertising content.

Also connected to the network 106 is one or more auxiliary content store 112 that stores the auxiliary content described above. Each of the one or more auxiliary content stores may be addressable for example using a URL referred to above.

FIG. 1 also illustrates an aspect variant store 113 and a mapping component 117. The purpose of the mapping component will be described in more detail later, but in principle this service maps content consumable in one environment to other content that is consumable in a different environment. Content consumable in different environment are termed "aspect variants" of the content. An "aspect variant" is a different form of the content on a common theme, as will be described in more detail later. Although reference numeral 113 denotes a specific aspect variant store, the ad store 112 and/or the primary content server 108 may also store aspect variants. As a simple example, an advertisement in the form of a trailer (in the ad store 112) can have as an aspect variant a movie which the trailer is advertising, and that movie would be stored in the primary server 108. The mapping component 117 can be located for example, at a content aspect delivery server.

Figure 2:
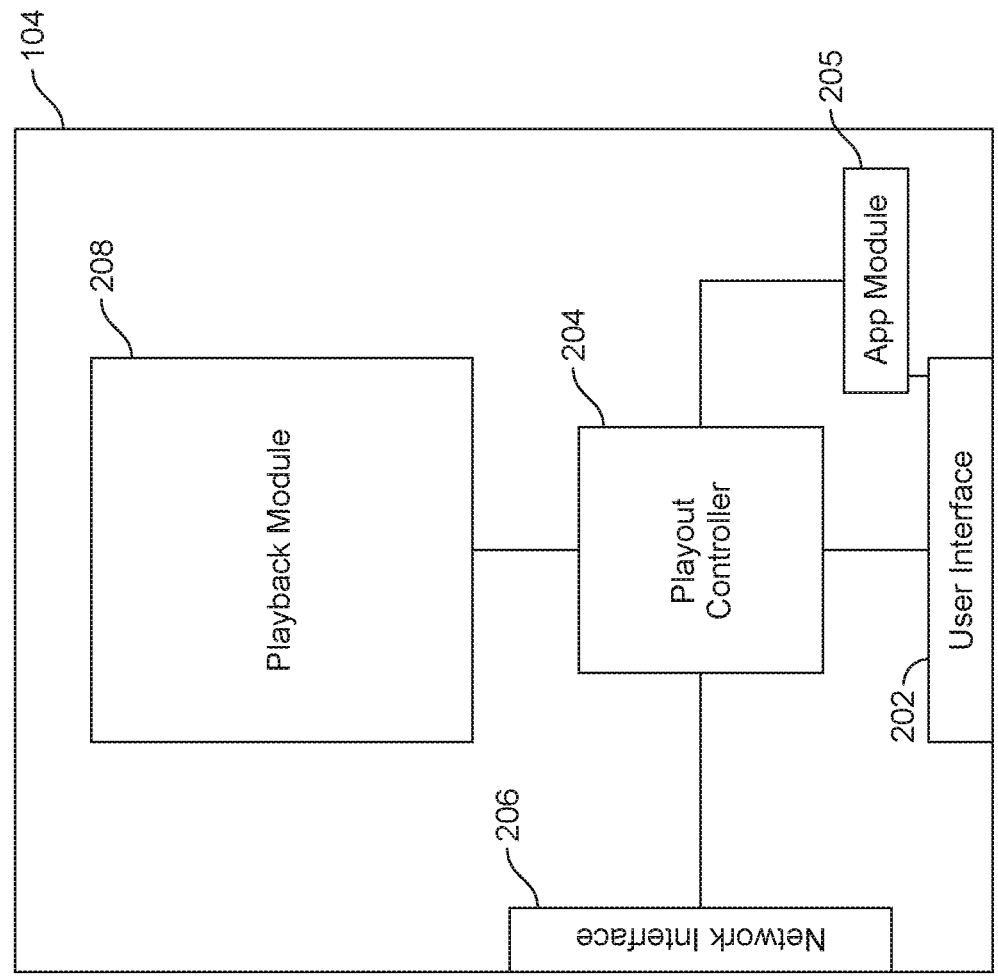
FIG. 2 shows a schematic view of a media playback device.

FIG. 2 is a schematic block diagram of the media playback device 104. The companion user device 114 comprises the same components of the media playback device 104 that are shown in FIG. 2.

The media playback device 104 comprises a user interface 202 for receiving user inputs from the content consuming user 102. The user interface 202 may take various forms, for example an infra-red (IR) receiver for receiving control signals from an IR remote control unit operated by the content consuming user 102, a touch-screen of the media playback device 104, or another input device such as a keypad, mouse, or microphone (for receiving voice commands).

The media playback device 104 is arranged to display media content that is available for selection by the content consuming user 102 on the display 105 of the media playback device 104. A content consuming user 102 is able to select desired media content that they wish to consume by supplying an input that is received by the user interface 202.

The media playback device 104 comprises a playout controller 204 that is coupled to the user interface 202 which enables the playout controller 204 configured to detect that a selection of desired media content has been made by the content consuming user 102.

The media playback device 104 further comprises a network interface 206 for connecting to the computer network 106. The network interface 206 can be wired interface such as an Ethernet interface, a wireless interface (WiFi, GSM etc.), or any other suitable interface which allows communication with the network 106.

In response to detecting a selection of desired media content by the content consuming user 102, the playout controller 204 is configured to transmit a request for the desired media content over the network 106 to the primary content server 108, and in response, receive the desired media content from the primary content server 108.

The playout controller 204 is configured to supply the desired media content to a playback module 208 of the media playback device 104 for playout to the content consuming user 102. For example, if the desired media content is video content (e.g. a TV episode), the playback module 208 handles the output of the desired media content to the display 105.

The playback module is one type of module which consumes content. Another type of module which consumes content is an app module 205. This app module is capable to taking any executables (that is sequences of computer code which can be executed by a processor) and executing them to supply an experience on the user interface. For example, a game could be played by a user through the app module 205. The app module and the playback module are both examples of media consumption modules for consuming content in different forms.

Embodiments of the present disclosure provide for "translating" content from one device to another, and changing the aspect variant of the content. For example, the aspect variant can add functionality (e.g. interactions), remove features (a video on a TV is no longer "playable" as a video when it becomes a playable game on an iPad) or improve the experience as a whole (e.g. a TV ad becomes actionable when brought to a mobile phone).

Currently, there is no process available which turns for example, a 30 second TV advert into a clickable iPad game. Embodiments of the present disclosure provide such a process by "mapping" two separate creatives designed by someone individually but on a common theme.

Consider other examples:
a trailer on an iPad may become the full movie on a TV
an ad on TV may become an interactive panel on an iPhone that lets the user get an emailed coupon/book a holiday/enter the lottery, etc.
a video stream of someone else playing a game may become the game itself.

In each case, the disparate forms of content can exist on their own (trailer, TV ad, video stream/movie, interactive panel, game) but are mapped to create an associative link that allows content aspect variant X to become aspect variant Y in order to achieve a particular effect.

A content consumable in one environment is mapped to other content that is consumable in a different environment at the mapping component 117. In this disclosure the verb "become" implies a novel process for accessing an aspect variant of content. The mapping component links otherwise independent forms of content so that viewers can traverse these connections more conveniently.

These associations can be considered as lateral connections between "domains" of content. Traditionally, if a user wanted to buy a book of the movie they were watching, they would have to access an eBook app and find the right book then buy it; if they wanted to schedule a test drive for the car they just saw in an ad, they would have to find their nearest car showroom, email/call them and arrange it. Embodiments of the present disclosure greatly simplify these processes and allow a user to get to the most appropriate interaction no matter what app/device/content-type boundaries that crosses.

In the present application, requests for translating content from one device to another are conducted based on a rewards scheme which is described later. It will be apparent however that the process for delivering aspect variants of content is not restricted to this context.

The mapping component 117 provides a server-side "directory" of groups of content items associated together. When implemented with a rewards scheme, access to any particular mapping is allowed by a particular permission voucher. Assume a user is watching a movie and wants to get the eBook, this is permitted if and only if the user possesses, or acquires, a permission voucher to enable this mapping to be accomplished.

In this way, each item in the map comprises the information about a content item and the permission voucher needed to unlock it.

A granting of a permission voucher to enable the mapping may be implicit, for example in the case where content items do not have different perceived values (e.g. a movie and a book), e.g. a video ad appearing on a TV that can be mapped to an interactive experience on a tablet, or a phone, or a link to a website to book an appointment; get a free sample, etc.

Moreover, a voucher may unlock more than one mapping: in the eBook example one voucher may permit the user to map the movie to an eBook in ePub format or iBook Store or any other format.

The choice of available variants may be narrowed by the target device's limited range of supported content formats, e.g. with a mapping that allows a trailer to be upgraded to a full game, the mapping might allow the trailer to become an Xbox, PS, iPad, Wii game, but the target device of the mapping in a given transaction would determine the format delivered.

Figure 3:
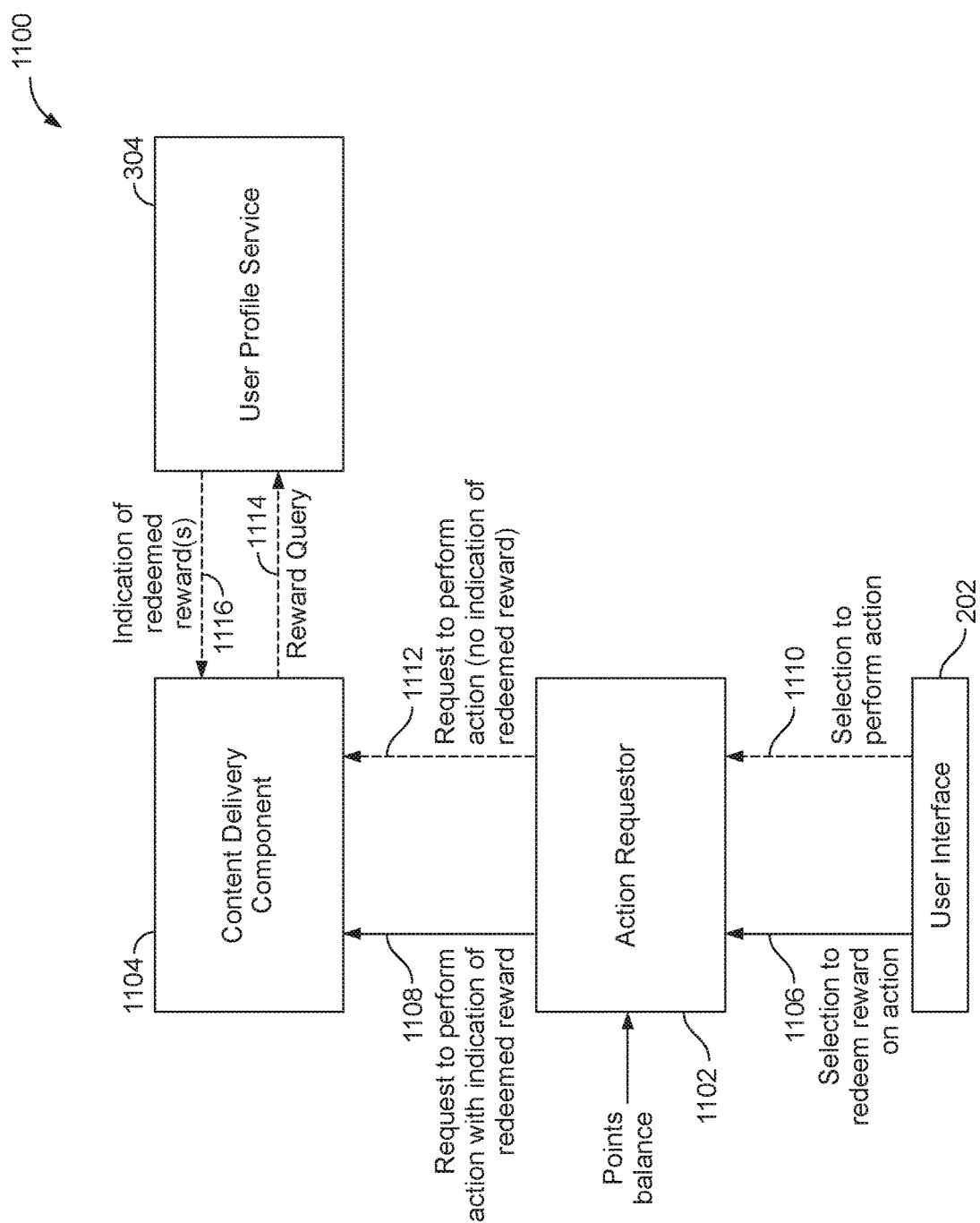
FIG. 3 is a schematic block diagram of components to translate content based on rewards.

Further embodiments related to reward redemption are described with respect to FIG. 3. FIG. 3 illustrates a schematic block diagram 1100 of the components in the content delivery system 100 that enable a translating action associated with delivery content to the content consuming user 102 to be performed based on a redeemed reward.

FIG. 3 illustrates, the user interface 202, an action requestor 1102, a content delivery component 1104 and the user profile service 304.

In embodiments described below the action requestor 1102 corresponds to the playout controller 204 or a component of the playout controller 204.

In response to detecting a selection by the content consuming user 102 using the user interface 102 on the media playback device 104 that the content delivery component 1104 performs an action associated with delivery of content, the action requestor 1102 is configured to transmit a request to perform this action, to the content delivery component 1104.

As described below, the media playback device 104 is able to display rewards on the display 105 that may be redeemed by the content consuming user 102 using the list of rewards received from the rewards service 302. The media playback device 104 may be configured to display all rewards identified in a received rewards list, or a subset of rewards (in the list of rewards) to the content consuming user 102, the reward point value associated with each reward in the subset of rewards having a reward point value equal to or less than the reward point balance associated with the media consumption account of the content consuming user 102.

The selection may indicate that the content consuming user 102 wishes to redeem a reward identified in the list of rewards received from the rewards service 302 on this action—this selection is illustrated in FIG. 3 by line 1106. In this scenario, the action requestor 1102 is configured, based on receiving the reward list and the reward point balance associated with the media consumption account of the content consuming user 102, to determine whether the selection is permissible based on the reward point balance associated with the media consumption account of the content consuming user 102 (i.e. whether the user has enough points to redeem the reward).

If the action requestor 1102 determines that the selection is permissible based on the reward point balance associated with the media consumption account of the content consuming user 102, the action requestor 1102 is configured to transmit the request that the content delivery component 1104 causes an aspect variant to be delivered, together with an indication of the redeemed reward—this request is illustrated in FIG. 3 by line 1108

The action requestor 1102 is further configured to communicate the redeemed reward to a rewards service 302. The rewards service 302 is configured to communicate this purchase to the user profile service 304; and also communicate this purchase to a reward point accumulator 306 so that the reward point balance associated with the media consumption account of the content consuming user 102 is updated.

Thus in response to receiving the request illustrated in FIG. 3 by line 1108, the content delivery component 1104 determines that the content consuming user 102 has redeemed a reward (at the time of the selection) related to the requested action based on the indication of the redeemed reward supplied with the request.

At the time the selection is made, the content consuming user 102 may not redeem a reward that is related to the action. Thus the selection may merely indicate that the content delivery component 1104 causes an aspect variant to be delivered—this selection is illustrated in FIG. 3 by line 1110.

In response to detecting this selection, the action requestor 1102 is configured to transmit the request to perform this action, to the content delivery component 1104.

In response to receiving the request illustrated in FIG. 3 by line 1108, the content delivery component 1104 determines that the request does not comprise an indication of a redeemed reward that would affect the way the requested action is performed by the content delivery component 1104.

It will be appreciated that a redeemed reward may have a lasting effect which is limited by a predetermined period of time following redemption or a predetermined number of usage instances.

Therefore, the content delivery component 1104 is configured to transmit a request to the user profile service component 304 for information on redeemed rewards associated with the user identifier for the content consuming user 102 by way of a reward query—this is illustrated in FIG. 3 by line 1114. In response to receipt of this request, the user profile service component 304 is configured to determine whether there are any currently valid rewards that have been purchased by the content consuming user 102 and return a response to the content delivery component 1104—this response is illustrated in FIG. 3 by line 1114. The response includes information on redeemed rewards associated with the user identifier for the content consuming user 102. Thus the content delivery component 1104 is configured to determine whether the content consuming user 102 has a currently valid reward (redeemed prior to the selection) that is related to the requested aspect variant based on the response received from the user profile service component 304.

In response to receipt of a request for delivery of content to the media playback device 104, the content aspect delivery server is configured to select and deliver an aspect variant of requested content to the companion device 104.

A content consuming user 102 is able to make a selection that an aspect variant of the requested content that is being played out on the media playback device 104 is delivered to the companion user device 114, by supplying an input that is received by the user interface 202. In response to detecting this selection, the playout controller 204 is configured to transmit a request to the content aspect delivery server requesting that an aspect variant of the requested content that is being played out on the media playback device 104 is delivered to the companion user device 114

The list of rewards (and the reward point value associated with each reward in the list) may include the reward point value for a reward of a specific aspect variant being selected and delivered to the companion user device 114 when the content consuming user 102 selects that a particular aspect variant of requested content is delivered to the companion user device 114.

The content aspect delivery server may determine that the user has selected to redeem rewards points on the reward based on either (i) an indication of the redeemed reward supplied with the request received from the playout controller 204 (for example the reward may provide delivery of the specific aspect variant to the companion user device 114 just once at the time the reward is redeemed); or (ii) transmitting a reward query to the user profile service component 304 and receiving a response therefrom (for example the reward may provide delivery of the specific aspect variant to the companion user device 114 (i) every time the content consuming user 102 selects that the particular aspect variant of requested content is delivered to the companion user device 114 (ii) for a limited period of time, or (iii) for only a limited number of times).

In response to determining that the user has selected to redeem rewards points on the reward, the content aspect delivery server is configured to transmit the specific aspect variant of the content (covered by the reward) over the network 106 to the companion user device 114.

The content aspect delivery server may correspond to the primary content providing server 108. A live stream of a computer game being played by gamers is the appropriate aspect variant of the content when requested by a television (example of media playback device 104). However the aspect variant for the computer game when the content is pulled to the companion user device 114 by the content consuming user 102 may be a playable version of the computer game. In this scenario, the reward may be that a full playable version of the game is selected and delivered to the companion user device 114 when the content consuming user 102 selects that an aspect variant of the computer game is delivered to the companion user device 114, rather than a demo playable version of the game that would otherwise be selected and delivered to the companion user device 114 when the content consuming user 102 selects that an aspect variant of the computer game is delivered to the companion user device 114

The content aspect delivery server may correspond to the auxiliary content store 112. Auxiliary content that is not interactive is the appropriate aspect variant of the auxiliary content when requested by a television (example of media playback device 104). In this scenario, the reward may be that an interactive version of the auxiliary content is selected and delivered to the companion user device 114 when the content consuming user 102 selects that an aspect variant of the uninteractive auxiliary content is delivered to the companion user device 114, rather than the uninteractive auxiliary content that would otherwise be selected and delivered to the companion user device 114 when the content consuming user 102 selects that an aspect variant of the auxiliary content is delivered to the companion user device 114. The term "aspect variant" is used herein to refer to a representation of content. For example, streaming a movie to a TV and downloading it to watch offline are both aspects of the same 'content'. They are different representations (aspect variants) of the same thing e.g. the movie. Similarly, a trailer is one aspect of a movie appropriate for its unpurchased state while the full-length asset is the variant appropriate for the purchased state. Both are different representations (aspect variants) of the same thing e.g. the movie.

The "media playback device" roles may swap. That is content "transformed" in one way may subsequently be further transformed, or transformed back.

For example, a movie might have aspect variants that include: the stream of the movie; a trailer; an eBook upon which the movie is based; a downloadable version of the movie for offline viewing. While the viewer may initially be watching the movie and may gain the right to download the eBook, they may then, while reading the eBook, transform back to the movie.

The collection of aspect variants from a pool of resources between which the user may transition/transform at will, assuming they have acquired the appropriate rights to do so.

The playout controller 204 may interact with the auxiliary content server 110 in accordance with the Video Ad Serving Template (VAST) specification released by the Interactive Advertising Bureau (IAB). That is, the request for auxiliary content insertion information transmitted to the auxiliary content server 110 may be a VAST request, and auxiliary content insertion information received from the auxiliary content server 110 may be a VAST response document (an XML document).

Reward points can be accrued based on monitoring user engagement data based on the content consuming user 102 consuming (e.g. watching, listening) auxiliary content or engaging with auxiliary content. Whilst embodiments are described herein with reference to rewards (otherwise referred to herein as permission vouchers) that are obtainable by redemption of reward points that are accrued through user consumption or engagement with auxiliary content, this is just one example of how a content consuming user 102 may obtain a reward and embodiments are not limited to this example. Embodiments extend to rewards that have been obtained via other methods known to persons skilled in the art e.g. payment, due to the media consumption account of the content consuming user 102 being active for a predetermined period of time, a promotion by a video on demand provider etc.

Figure 4A:
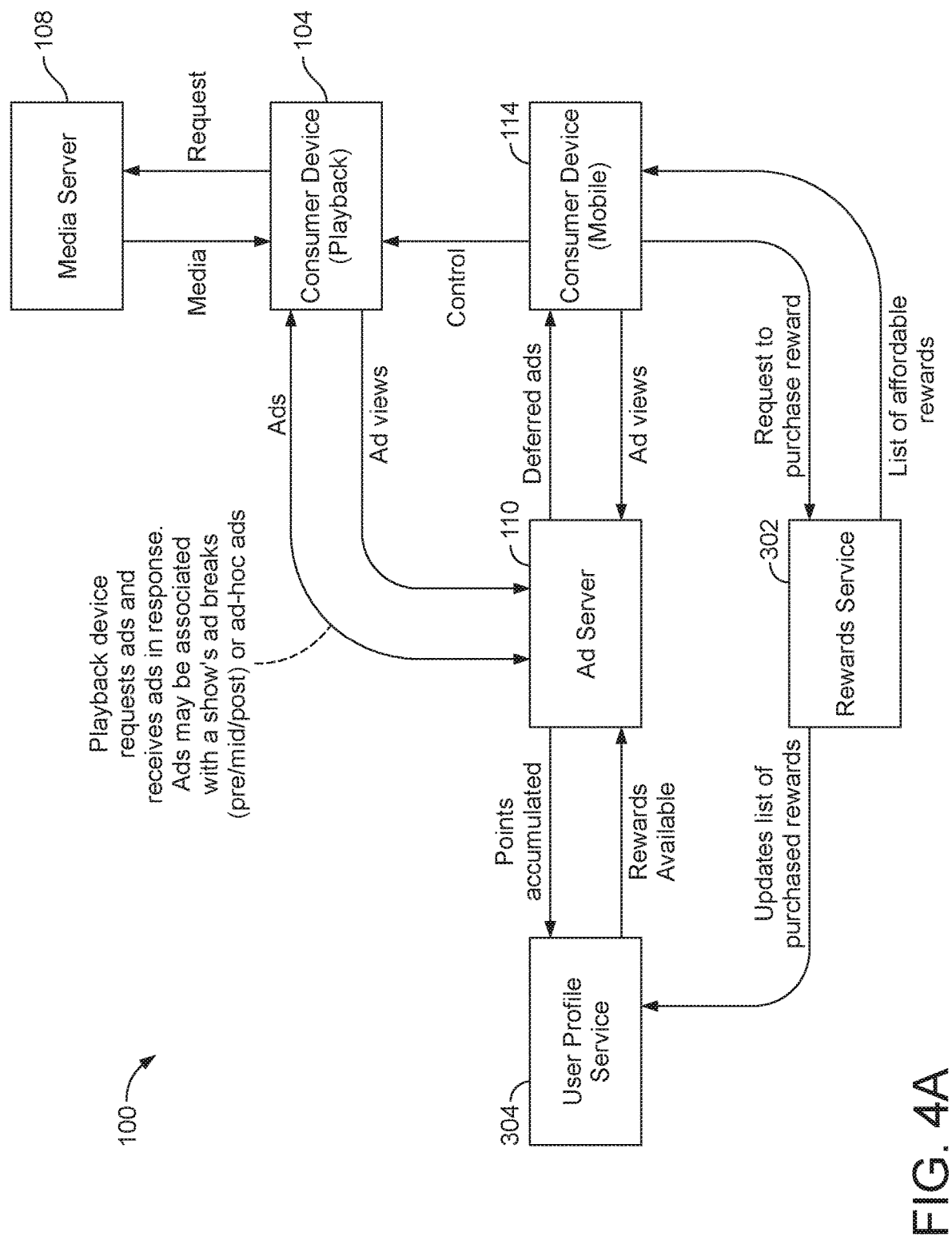
FIGS. 4a and 4b illustrates network components in the content delivery system.
Figure 4B:
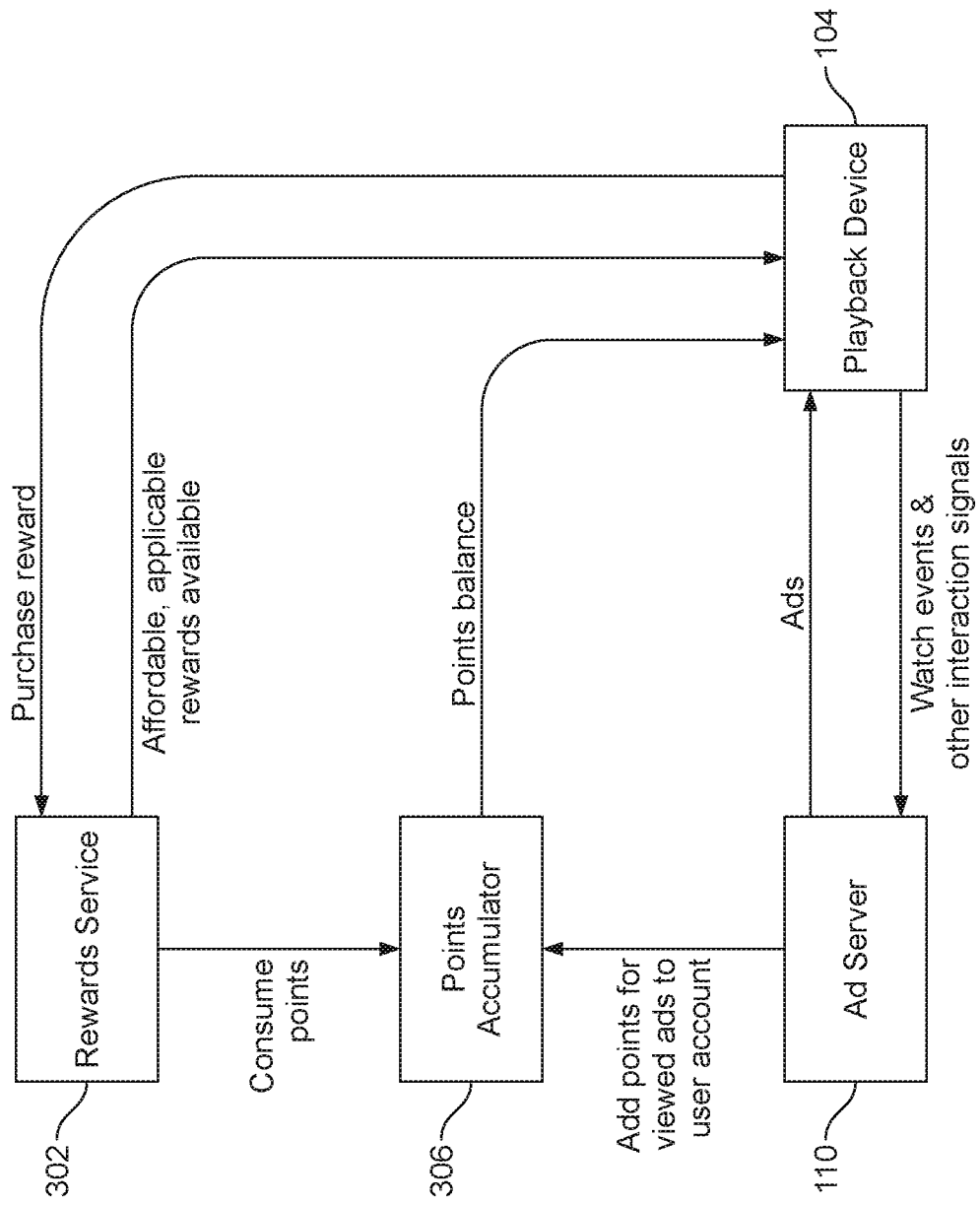

FIGS. 4a and 4b illustrates components of the content delivery system 100 described above with reference to FIG. 1 (i.e. the media playback device 104, companion user device 114, primary content server 108 and auxiliary content providing server 110).

In addition FIG. 4a illustrates the rewards service component 302 and the user profile service component 304. The rewards service component 302 may be implemented on a dedicated server connected to the network 106, alternatively the functionality of the rewards service 302 may be implemented on the auxiliary content providing server 110. Similarly, the user profile service component 304 may be implemented on a dedicated server connected to the network 106, alternatively the functionality of the user profile service 304 may be implemented on the auxiliary content providing server 110. Implementation of the rewards service component 302 and a user profile service component 304 on a network entity such as a server provides security against malicious users attempting to edit the information stored by these components.

FIG. 4b illustrates a reward points accumulator component 306. The reward points accumulator component 306 may be implemented on a dedicated server connected to the network 106, the server described above implementing the rewards service 302 functionality, the server described above implementing the user profile service component 304, or on the auxiliary content providing server 110.

FIGS. 4a and 4b illustrate the data that is transmitted between the components of the content delivery system 100. For example, FIG. 4a illustrates that the media playback device 104 is configured to transmit a request for desired media content over the network 106 to the primary content server 108, and in response, receive the desired media content from the primary content server 108 (described above). Furthermore, FIGS. 4a and 4b illustrates that the media playback device 104 is configured to transmit a request for auxiliary content insertion information to the auxiliary content server 110 over the network 106, and in response, receive auxiliary content insertion information from the auxiliary content server 110.

Other data that is transmitted between the components of the content delivery system 100 shown in FIGS. 4a and 4b is described below with reference to embodiments of the present invention.

Figure 5:
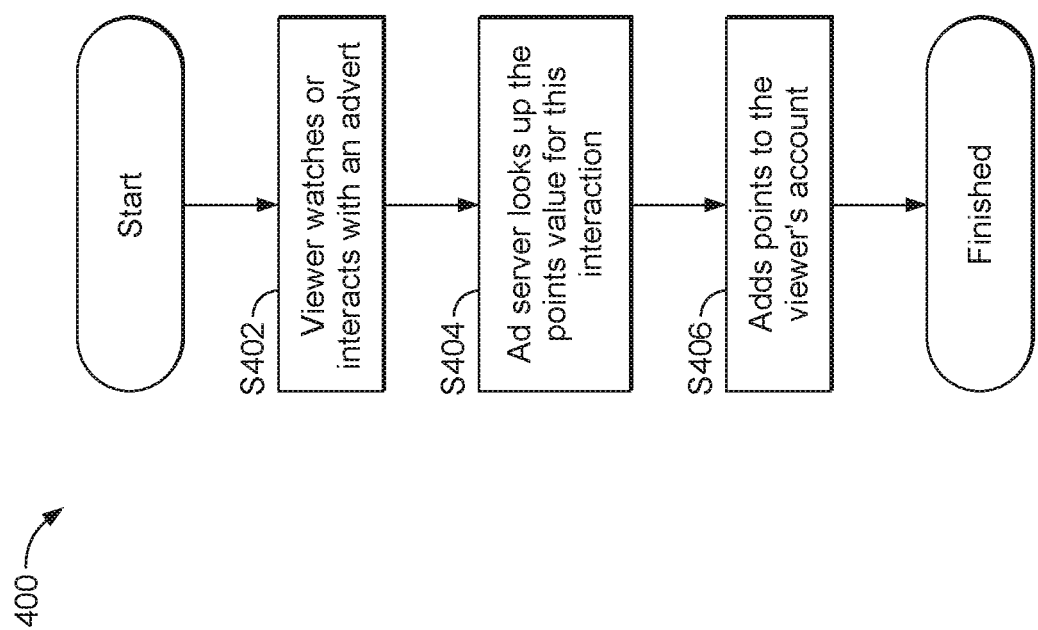
FIG. 5 illustrates a flow chart for a process of associating reward points with an account associated with a content consuming user.

Reference is now made to FIG. 5 which illustrates a process 400 performed by the auxiliary content providing server 110 for associating reward points with a media consumption account associated with the content consuming user 102. The user profile service 304 is configured to maintain information on accumulated reward points and available rewards (otherwise referred to herein as permission vouchers) for each user of the content delivery system 100.

At step S402, the auxiliary content providing server 110 detects that the content consuming user 102 has consumed or interacted with a piece of auxiliary content played out on the media playback device 104.

The auxiliary content providing server 110 is able to detect that the content consuming user 102 has consumed auxiliary content based on one or more tracking event reports received from the media playback device 104. This is illustrated by the "ad views" data flow shown in FIG. 4a and the "watch events" data flow shown in FIG. 4b.

The auxiliary content providing server 110 may detect that the content consuming user 102 has interacted with a piece of auxiliary content using one or more methods that are described below.

In a first method, after playback of auxiliary content on the media playback device 104 (detected by the auxiliary content providing server 110 based on a tracking event report received from the media playback device 104), the auxiliary content providing server 110 transmits a user engagement request to the companion user device 114 which causes a user engagement element to be shown on the display 115 of the companion user device 114 in the form of a question displayed to the content consuming user 102.

Alternatively, during playback of auxiliary content on the media playback device 104 (detected by the auxiliary content providing server 110 based on a tracking event report received from the media playback device 104), the auxiliary content providing server 110 transmits the user engagement request to the companion user device 114.

This is so that the playout controller on the companion user device 114 can prepare the user engagement element to be shown on the display 115 at the end of playout of the auxiliary content, or to facilitate display of the user engagement element on the display 115 that may appear during playout of the auxiliary content.

The content consuming user 102 can engage with the user engagement element by supplying an input e.g. by responding to the question either by entering data into a field displayed to the content consuming user 102, or responding using voice (detected by a microphone of the companion user device 114), or responding by making a gesture. When the content consuming user 102 responds using voice or gesture, the playout controller on the companion user device 114 detects the voice/gesture and recognises the user response.

After this user engagement, a user engagement response is transmitted from the companion user device 114 to the auxiliary content providing server 110. This is illustrated by the "Ad views" data flow shown in FIG. 4*a*.

The auxiliary content providing server 110 detects whether or not the content consuming user 102 has responded properly by assessing whether an expected user actuation has been executed. For example, where a response is to be entered in text, the quality of the text is assessed to ensure it is meaningful. Where a user selection is made (multiple choice), only the set number of selections should be made. The playout controller on the companion user device 114 may comprise sufficient logic to validate an input (e.g. when only one option from a multiple choice selection is permitted, to check that only one option from the multiple choice selection has been made), but only the auxiliary content providing server 110 would check if a validated answer is the correct one. Similarly, only the auxiliary content providing server 110 allocates points.

The user engagement element can comprise a survey which includes multiple questions with associated fields for responses, wherein the questions and responses concern the auxiliary content. The user engagement element can take alternative forms to a survey requiring text responses. It could be a kind of game, or multiple choice. Any kind of user engagement element permitting a monitorable user response is envisaged.

In the above embodiment, the companion user device 114 operates to select the desired content and operates to display the auxiliary content (for example, the advertisement) and the user engagement elements (such as the survey). However, the principles described herein can also be applied to a scenario where there is a single device which both plays the desired content, the auxiliary content and the user engagement element. That same device can be used to select the content. A further alternative is to have a companion device used to select the content, where the desired content, auxiliary content and user engagement elements are displayed on a separate device. In yet a further alternative, auxiliary content and user engagement elements are displayed on a plurality of devices if a group of viewers is present. This enables the auxiliary content, and therefore the user engagement elements to be tailored to each of the viewers in the group. This enables each of the viewers to receive auxiliary content and user engagement elements that is potentially customised for them explicitly. For example, a television advert for a clothes retailer displayed on the media playback device 104 might have a secondary experience on a mobile device that shows men's clothes to male viewers and ladies' clothes to female viewers.

Where one device is used to display the desired content, the auxiliary content and the user engagement elements, two separate display portions or a picture in picture technology can be utilised. Alternatively, the auxiliary content can be displayed first, followed by the user engagement element and then followed by the desired content on the same screen.

In a second method, during playback of auxiliary content on the media playback device 104 (detected by the auxiliary content providing server 110 based on a tracking event report received from the media playback device 104), the auxiliary content providing server 110 transmits a user engagement request to the media playback device 104 which causes a user engagement instruction to be output from the media playback device 104 to the content consuming user 102. For example an audible user engagement instruction may be output from speakers of the media playback device 104 or a visual user engagement instruction may be shown on the display 114 of the media playback device 104. The user engagement instruction encourages the content consuming user 102 to make a selection in an area of the display 114 where the auxiliary content is being displayed. For example, if the auxiliary content is a car advert the user engagement instruction may ask the content consuming user 102 to tap a colour or car model that they prefer, or ask them to sign-up for a trial period by tapping a specific area of the display 104. Whilst auxiliary content is described in this example as advertising content, the auxiliary content is not limited to being advertising content, the auxiliary content may for example be a trailer for a movie or a TV programme.

The content consuming user 102 can engage with the auxiliary content by supplying an input to the user interface 202 e.g. by responding to the user engagement instruction by tapping a specific area of the display 105. When the content consuming user 102 responds, the media playback device 104 is configured to transmit a user engagement response to the auxiliary content providing server 110. This is illustrated by the "Interaction signal" data flow shown in FIG. 3*b*.

The auxiliary content providing server 110 detects whether or not the content consuming user 102 has responded properly by assessing whether an expected user actuation has been executed.

Other methods of how the auxiliary content providing server 110 may detect that the content consuming user 102 has interacted with a piece of auxiliary content are possible and are described for example in commonly owned British application GB 1421012.4 and International application PCT/EP2014/075713.

Referring back to the process 400 shown in FIG. 5, once the auxiliary content providing server 110 detects that the content consuming user 102 has interacted with a piece of auxiliary content in accordance with expected activity the process 400 proceeds to step S404 where the auxiliary content providing server 110 determines the reward point value for the consumption or interaction with auxiliary content detected at step S402. Reward points provided based on the content consuming user 102 consuming auxiliary content may be lower than the reward points provided based on the content consuming user 102 interacting with auxiliary content. In terms of consumption (e.g. viewing/listening) of auxiliary content, auxiliary content that is longer in length than other shorter auxiliary content may earn the content consuming user 102 more reward points than consumption of the shorter auxiliary content. In terms of interacting with auxiliary content, auxiliary content that require more detailed interactions may earn the content consuming user 102 more reward points than auxiliary content that require simpler interactions.

The auxiliary content providing server 110 communicates the reward point value determined at step S404 to the reward point accumulator 306 this is illustrated by the "Add points for viewed ads to user account" data flow shown in FIG. 4*b*. This enables the reward point accumulator 306 to communicate the reward point balance of each user of the content delivery system 100 to the respective users. FIG. 4*b* illustrates the reward point accumulator 306 communicating the reward point balance of the content consuming user 102 to the media playback device 104 by way of the "Points balance" data flow.

As described above, the reward point accumulator 306 may be implemented on the server implementing the user profile service component 304. Thus in this embodiment, at step S406, the auxiliary content providing server 110 communicates the reward point value determined at step S404 to the reward point accumulator 306 on the user profile service 304 so that the reward point value determined at step S404 are added to reward point balance associated with a media consumption account associated with the content consuming user 102. This is illustrated by the "Points accumulated" data flow shown in FIG. 4a.

In order to translate content to provide different aspect variants, the content consuming user 102 is able to redeem accumulated reward points on rewards that enhance the overall content consumption experience of the content consuming user 102. Embodiments discussed below enable flexibility as to when redemption of accumulated reward points may occur.

Prior to selection of desired media content, the content consuming user 102 may redeem accumulated reward points on one or more rewards.

A list of rewards available for redemption by the content consuming user 102 is communicated from the rewards service 302 to either the media playback device 104 or the companion user device 114 associated with the content consuming user 102 for display to the content consuming user 102. This is illustrated by the "list of affordable rewards" data flow shown in FIG. 4a (list of rewards communicated to the companion user device 114) and the "affordable, applicable rewards available" data flow shown in FIG. 4b (list of rewards communicated to the media playback device 104).

Each reward in the list of rewards is associated with a number of reward points required to redeem the reward. By a device (the media playback device 104 or the companion user device 114) having access to the list of rewards (and the reward point value associated with each reward in the list) and the reward point balance associated with the media consumption account of the content consuming user 102, the device is able to display a subset of rewards (in the list of rewards) to the content consuming user 102, the reward point value associated with each reward in the subset of rewards having a reward point value equal to or less than the reward point balance associated with the media consumption account of the content consuming user 102.

The rewards list may include rewards that are associated with different expiry time periods.

When a reward is purchased by the content consuming user 102 by making a selection on the media playback device 104 or the companion user device 114, this reward purchase is communicated to the rewards service 302. This is illustrated by the "request to purchase reward" data flow shown in FIG. 4a (selection of reward made using companion user device 114) and the "purchase reward" data flow shown in FIG. 4b (selection of reward made using the media playback device 104).

When a reward is purchased by the content consuming user 102, the rewards service 302 is configured to communicate this purchase to the user profile service 304. This is illustrated by the "updates list of purchased rewards" data flow shown in FIG. 4a.

When a reward is purchased by the content consuming user 102, the rewards service 302 is also configured to communicate this purchase to the reward point accumulator 306 this is illustrated by the "consume points" data flow shown in FIG. 4b. This enables the reward point accumulator 306 to communicate the updated reward point balance of the content consuming user 102 to the media playback device 104 by way of the "Points balance" data flow.

Whilst it has been described above that prior to selection of desired media content, the content consuming user 102 may redeem accumulated reward points on one or more rewards. Embodiments of the present invention extend to the redemption of accumulated reward points on a reward after selection of desired media content.

A process for delivery an aspect variant of media content will now be described. Assume that the user 102 is viewing the media playback device 104 and views a piece of content. The user interface (either on the media playback device 104 or on the companion device 114) can indicate that that piece of media content has an aspect variant which is available. The user interface can also indicate that the user has reward vouchers which would enable him to access the aspect variant. The user interface can display a list of available aspect variants for selection by a user. The user may be constrained as to which aspect variant he can select, based on his rewards. As already explained with reference to FIG. 3, when the user selects to redeem a reward, the action requestor component 1102 requests to perform the action with the indication of the redeemed reward. This request is passed to content aspect delivery server with the mapping component 117. The mapping component holds media content aspect variant data defining the aspect variants which are linked to the piece of media content which is being viewed on the playback device 104. Thus, the request from the user causes the content aspect delivery server to provide media content aspect variant data to the companion device 114. This data may constitute the aspect variant (or variants) itself, but is it more likely that the data will constitute an address where the aspect variant can be accessed. If there is more than one aspect variant available, these can be displayed to the user and the user may make a selection among them. Where the media content aspect variant data defines an address, this address is used to access that aspect variant. For example, the aspect variant could lie in the ad store 112, the aspect variant store 113, the primary content server 108. Thus, the aspect variant becomes available to the user on the companion device 114.

Content which has been "transformed" in this way, can further be transformed into a different aspect variant in the set of associated aspect variants. Alternatively, it may be transformed back to the playback device in the original form, or on the companion device but in the original form. For example, a movie might have aspect variants that include the stream of the movie, a trailer, an eBook upon which the movie is based, a downloadable version of the movie for offline viewing. While the viewer may initially be watching the movie and may gain the right to the download the eBook, they may then, while reading the eBook, transform back to the movie.

The invention claimed is:
1. A content delivery system comprising:
  a communication network;
  a mapping component storing media content aspect variant data enabling access to media content in a plurality of aspect variants, wherein the mapping component stores the aspect variant data in associated sets of variants of media content, whereby each variant in a set has an associative link to one or more other variants in the set;

a content delivery component connected to the communication network and configured to access and deliver the media content aspect variant data stored in the mapping component to devices connected to the communication network, wherein a piece of media content is provided for display to a user on a first media consumption device, the user further being associated with a second media consumption device;
an action requestor component which is configured to:
indicate on a user interface of the first or second media consumption device that: (i) the piece of piece content has at least one available aspect variant, including displaying the list of available aspect variants for selection by a user, and (ii) user reward vouchers that enable access to the at least one available aspect variant, wherein the user is constrained as to selection of aspect variants in dependence on the rewards;
receive a request from a user of the first media consumption device for redemption of a reward associated with an aspect variant of media content, which aspect variant is to be delivered to the second media consumption device; and
cause the content delivery component to deliver media content aspect variant data associated with the aspect variant to the second media consumption device to enable the aspect variant of the media content to be consumed at the media consumption device.

2. A content delivery system according to claim 1, wherein the action requestor component is further configured to receive the request from the user of the media consumption device during consumption of the media content at the media consumption device.

3. A content delivery system according to claim 1, further comprising:
a store holding a set of reward vouchers for each of a plurality of users of the system, wherein the action requestor component is further configured to determine if there is a reward voucher in the set for the user of a type that grants permission to deliver the media content aspect variant data to the second media consumption device, and if so to cause the media content aspect variant data to be displayed on the user interface.

4. A content delivery system according to claim 1, wherein the plurality of aspect variants of the media content include different versions of the same content type, and wherein a short version of the media content is consumed at the first media consumption device, and the media content aspect variant data which is delivered by the content delivery component to the second media consumption device comprises an identifier enabling access to a long version of the media content stored in a media content store connected to the communication network.

5. A content delivery system according to claim 1, wherein the first media consumption device comprises the action requestor component.

6. A content delivery system according to claim 1, wherein the action requestor component is connected to the communication network and further configured to receive the request from the first media consumption device, and to cause the content delivery component to deliver the media content aspect variant data associated with the aspect variant to the second media consumption device by transmission of a content delivery message to the content delivery component.

7. A content delivery system according to claim 1, wherein the first media consumption device is arranged to transmit a request for accessing content to the content delivery component via the communications network in response to a user accessing a content delivery service.

8. A content delivery system according to claim 1, wherein the action requestor component is further configured to receive a subsequent request from the user during consumption of the aspect variant and to cause the content delivery component to deliver the media content which was originally being consumed at the media consumption device.

9. A content delivery system according to claim 1, wherein the action requestor component is further configured to receive a subsequent request from the user and to deliver a further aspect variant of the media content to one or both of the first and second media consumption devices.

10. A content delivery system according to claim 3, wherein the action requestor component is further configured to select the aspect variant of the media content based on the set of reward vouchers for the user.

11. A content delivery system according to claim 4, wherein a non-interactive version of the media content is consumed at the first media consumption device, and the media content aspect variant data which is delivered by the content delivery component to the second media consumption device further comprises an identifier enabling access to an interactive version of the media content stored in a media content store connected to the communication network.

12. A content delivery system according to claim 4, wherein the media content aspect variant data which is delivered by the content delivery component to the second media consumption device further comprises an identifier enabling access to advertising content associated with the media content stored in an advertising content store connected to the communication network.

13. A content delivery system according to claim 12, wherein a live stream of a computer game is consumed at the first media consumption device, and the media content aspect variant data which is delivered by the content delivery component to the second media consumption device further comprises an identifier enabling access to a playable version of the computer game stored in a game store connected to the communication network, wherein the playable version of the computer game is one of a full playable version of the computer game and a limited feature playable version of the computer game.

14. A content delivery system according to claim 12, wherein the media content is one of a video advertising content and a static image advertising content, and the media content aspect variant data which is delivered by the content delivery component to the second media consumption device is one of a video advertising content and a static image advertising content.

15. A content delivery system according to claim 13, wherein the aspect variant is optimised for the second media consumption device.

16. A content delivery system according to claim 6, wherein the content delivery component is configured, in response to receipt of the content delivery message to access the media content aspect variant data and deliver the media content aspect variant data associated with the aspect variant of the media content to the second media consumption device.

17. A content delivery system according to claim 7, wherein the content delivery service is a software application executed on the first media consumption device.

18. A method for delivering content comprising:
displaying on a first media consumption device of a user a piece of media content, wherein the user is also associated with a second media consumption device;

indicating on a user interface of the first or second media consumption device that the piece of content has an available aspect variant, including displaying the list of available aspect variants for selection by the user, indicating on the user interface of the first or second media consumption device user reward vouchers that enable access to the at least one available aspect variant, wherein the user is constrained as to selection of aspect variants in dependence on the rewards;

requesting redemption by the user of a reward associated with an aspect variant;

accessing a set of aspect variants data of aspect variants of the media content stored at a mapping component, wherein the mapping component stores the aspect variant data in associated sets of variants of media content, whereby each variant in a set has an associative link to one or more other variants in the set; and causing the aspect variant associated with the redeemed reward to be delivered to the second media consumption device of the user.

19. The method of claim 18, wherein the media content is being consumed at the first media consumption device.

20. A computer program product, the computer program product being embodied on a non-transient computer-readable medium and configured so as when executed on a processor to:

display on a first media consumption device of a user a piece of media content, wherein the user is also associated with a second media consumption device;

indicate on a user interface of the first or second media consumption device that the piece of content has an available aspect variant, including displaying a list of available aspect variants for selection by the user, indicate on the user interface of the first or second media consumption device user reward vouchers which enable access to the at least one available aspect variant, wherein the user is constrained as to selection of aspect variants in dependence on the rewards;

request redemption by the user of a reward associated with an aspect variant;

access a set of aspect variants data of aspect variants of the media content stored at a mapping component, wherein the mapping component stores the aspect variant data in associated sets of variants of media content, whereby each variant in a set has an associative link to one or more other variants in the set; and cause the aspect variant associated with the redeemed reward to be delivered to the second media consumption device of the user.

* * * * *